Patented May 18, 1937

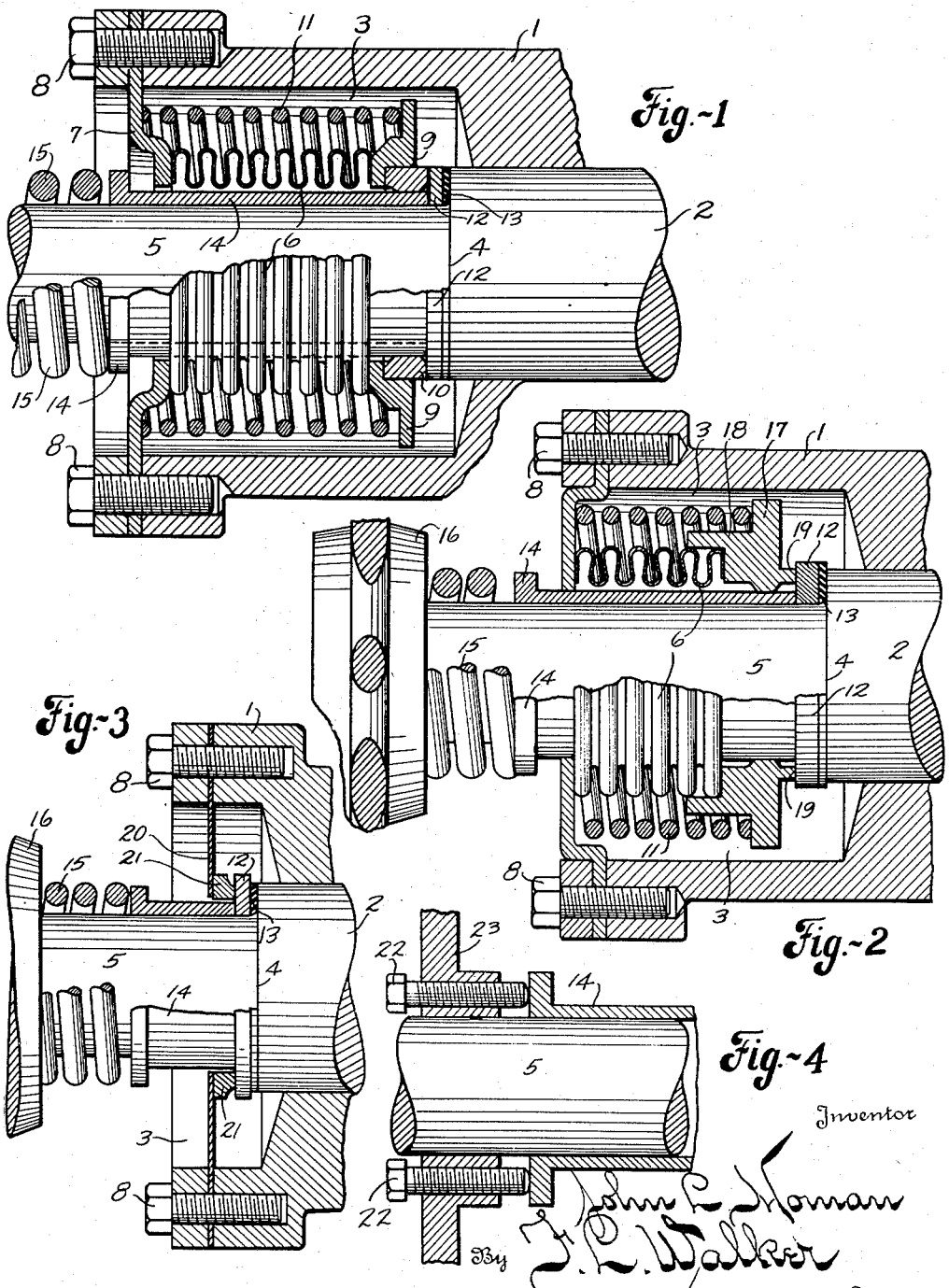

2,080,403

UNITED STATES PATENT OFFICE 2,080,403

SHAFT SEALING DEVICE FOR REFRIGERATORS

John L. Homan, Dayton, Ohio

Application March 14, 1936, Serial No. 68,845

6 Claims. (Cl. 286—11)

This invention comprises a bearing seal for closing a rotary shaft bearing against the escape or entrance of fluid, which while applicable to a wide range of other installations for preventing leakage of liquids or gases is peculiarly adapted for sealing the shaft bearing of a refrigerant compressor against the loss of refrigerant gas.

Heretofore much difficulty has been experienced due to leakage of refrigerant gases through the compressor shaft bearing. The maintenance of a tight leak proof connection at such point presents a serious service problem. Ordinarily such bearings are provided with a yielding sylphon or bellows type closure connected with a steel bearing or contact ring which is spring pressed against a replaceable hardened shaft seat or bearing ring embedded or seated in a packing of synthetic rubber, composition, or other packing material. Such packing material softens and deteriorates under the influence of refrigerant gases, especially when $SO_2$ is employed which many times will leak through joints which are amply effective to hold other fluid. A most frequent path of leakage is through or about the packing material against which the shaft seat or bearing ring is positioned. Ordinarily the shaft seat or bearing ring is forced against the packing material under spring tension equalized with that of the seal bearing or contact ring upon such shaft seat.

In the construction forming the subject matter hereof the seating of the shaft seat or bearing ring against a suitable gasket of packing material is effected under increased pressure greater than that exerted by the seal bearing or contact ring with such shaft seat or bearing ring. While the present construction is especially adapted for use as a replacement unit in the servicing of refrigerator installations wherein the original bearing seal has deteriorated or become ineffective, the present bearing seal unit is nevertheless usable for initial or original installation thus minimizing the necessity for subsequent servicing or replacement of the shaft.

The object of the invention is to improve the construction as well as the means and mode of installation of bearing seal assemblies whereby such assembly may not only be economically manufactured but will be more efficient in use, of increased durability, adapted to automatically compensate for wear, having relatively few parts, capable of being easily and quickly installed, and unlikely to get out of repair.

A further object of the invention is to provide means for seating and securing the replaceable shaft seat or bearing ring securely and tightly in leak proof relation with the shaft, independently of the pressure with which the seal bearing or contact ring engages the shaft seat or bearing ring.

A further object of the invention is to provide means for seating and securing the replaceable shaft seat or bearing ring under greater pressure and with increased frictional engagement with the shaft than is afforded by the engagement of the bearing seal or contact ring with the shaft seat or bearing ring.

A further and important object of the invention is to securely and tightly seat the replaceable shaft seat or bearing ring in leak proof relation with the shaft under tension whereby any wear or yielding of the seat ring will be automatically compensated.

A further object of the invention is to provide a shaft bearing seal which may be readily applied to existing constructions either as a replacement assembly or as an original installation.

With the above primary and other incidental objects in view as will more fully appear in the specification, the invention consists of the features of construction, the parts and combinations thereof, and the mode of operation, or their equivalents as hereinafter described and set forth in the claims.

Referring to the accompanying drawing wherein is shown the preferred but obviously not necessarily the only forms of embodiment of the invention, Fig. 1 is an enlarged sectional view of a shaft bearing seal assembly embodying the present invention.

Fig. 2 illustrates a slightly modified form of the bearing seal construction utilizing a typical form of seal bearing or contact ring and sylphon with which the improved features of construction are associated.

Fig. 3 illustrates the present invention applied to a diaphragm type of bearing seal.

Fig. 4 is a detail sectional view illustrating a variation of the application of thrust pressure to the replaceable shaft seat assembly.

Like parts are indicated by similar characters of reference throughout the several views.

While the present invention is peculiarly adapted for sealing the shaft bearings of a refrigerator compressor unit and for convenience of illustration is herein so shown and described, it is to be understood that it is not limited to such application but may be variously employed for either excluding or confining either liquids or gases which might otherwise leak through a shaft bearing. One of such fields of usefulness is in vapor proof electric motors for preventing the entrance of inflammable or explosive gases. Likewise the present seal will find a field of application in chemical laboratories in the prevention of the passage of injurious liquids or gases either into or out of a machine, motor, or other apparatus. Likewise the seal will be found useful in those installations where a machine including a rotating shaft must be operated in a submerged position.

Referring to the drawing, 1 indicates a portion of the machine, motor, compressor, or other bearing in which is journaled the revoluble shaft 2. The bearing 1 is recessed or chambered forming a reentrant counterbore 3 within which the revoluble shaft 2 is of reduced diameter affording a peripheral shoulder 4.

Surrounding the reduced extension 5 of the shaft 2 within the counterbore or recess 3 is a sylphon or bellows 6 the outer extremity of which is brazed, soldered, or otherwise fixedly attached to a closure head 7 secured by bolts 8 to the outer face of the bearing body 1 and having therein a concentric opening substantially coincident with the interior diameter of the sylphon or bellows 6 through which the shaft extends. At its inner end the bellows or sylphon 6 is soldered, brazed or otherwise secured to a thrust collar 9. The thrust collar 9 is counterbored or rabbeted to receive a seal bearing or contact ring 10. The bearing ring 10 is preferably although not necessarily made of an antifriction material such as graphite or graphite impregnated bronze, or of a bronze alloy which is impervious to the passage of gases or the like and will offer minimum frictional resistance.

The thrust collar 9 is outwardly flanged to form a bearing seat for an expansive helical spring 11 interposed between such thrust collar 9 and the head 7 of the seal chamber or recess. Under the expansive tension of the helical spring 11 the bearing seal ring or contact ring 10 is pressed against a hardened steel shaft seat collar or bearing ring 12. This shaft seat ring or bearing ring 12 is held against the shoulder of the shaft 2 under a thrust pressure greater than that exerted by the spring 11. Interposed between the shaft seat collar or bearing ring 12 and the shaft shoulder 4 is a gasket 13 of suitable sealing or packing material. This packing gasket may be of composition or of a soft metal such as soft lead, soft copper, or a lead, antimony and tin alloy. It may be of other suitable sealing packing substance which is impervious and resistant to the action of the particular gas or liquid to be confined or excluded as the case may be. In any event the interposition of this gasket 13 of sealing material compressed between the shaft seat collar or bearing ring 12 and the shoulder 4 under a thrust pressure greater than that under which the bearing seal or contact ring 10 engages the shaft seat collar 12 under influence of the spring 11 insures a tight leak proof joint. The shaft seat collar 12 and interposed packing gasket 13 are subjected to thrust pressure by a sleeve 14 which surrounds the reduced portion of the shaft 2 with its inner end abutting the shaft seat collar 12 and its outer end extending beyond the head 7 where it is peripherally flanged to afford a bearing seat for an expansive helical tension spring 15. The spring 15 is ordinarily interposed between the flanged head of the thrust sleeve 14 and a fly wheel, pulley, or other element 16 mounted upon the extremity of the shaft 2. The tension of the spring 15 is materially greater than that of the spring 11. Therefore the frictional engagement of the shaft seat collar 12 with the interposed gasket 13 and the latter with the shaft shoulder 4 is very much greater than the wiping frictional contact of the bearing seal or contact ring 10 with the shaft seat collar 12 under influence of the spring 11. Consequently there can be no possible tendency for the shaft seat collar 12 and gasket 13 to shift or change their relation with the shaft and they are compelled to rotate in unison with the shaft 2. At the same time the tension of the spring 15 serves to automatically maintain such relation and in the event of the gasket 13 shrinking or any change of relationship arising from any source whatsoever, the spring 15 will automatically compensate for such change and maintain the shaft seat collar or bearing ring and gasket under constant pressure. As before noted the shaft seat collar or bearing ring 12 and gasket 13 are subjected to such tension or pressure not only independently of the pressure exerted thereon by the bearing seal or contact ring 10 under influence of the spring 11 but also to a tension or pressure much greater than that afforded by the spring 11. The shaft seat collar or bearing ring 12 and gasket 13 are subject to simultaneous pressure of both springs 11 and 15. While for convenience the spring 15 abuts upon the hub of the fly wheel or pulley 16, it is to be understood that in lieu thereof a collar may be secured upon the shaft to afford such abutment in the event that the pulley or fly wheel is not employed.

Referring to Fig. 2 of the drawing, the construction is substantially the same as that shown in Fig. 1 except that in lieu of separately formed thrust collar 9 and seal bearing ring 10, these elements are combined into a single composite collar 17 having therein a peripheral shoulder or rabbet 18 forming the seat for the spring 11 and an annular rib 19 which has wiping contact with the shaft seat collar 12.

In some installations in lieu of a sylphon or bellows 6 a flexible metal diaphragm is employed as shown at 20 in Fig. 3. This diaphragm 20 is peripherally clamped to the face of the bearing member 1 and is provided with a central opening through which the shaft 2 extends. Adjacent to its inner margin the diaphragm 20 is soldered, brazed, or otherwise affixed to a seal bearing collar 21 preferably although not necessarily of antifriction material. This seal bearing collar 21 has a wiping contact under pressure with the shaft seat collar or bearing ring 12 incident to the thrust reaction of the shaft against the inherent tension of the diaphragm 20. The bearing seat collar 12 and interposed gasket 13 are held against the shaft shoulder 4 by the thrust pressure of the spring 15 under influence of the sleeve 14 under influence of the spring 15 as before described.

In lieu of utilizing the tension spring 15 for maintaining the thrust sleeve 14 under pressure, a series of adjusting screws 22 as shown in Fig. 4 carried by a collar, pulley, or wheel 23 secured upon the shaft 2 may bear upon the head of the thrust sleeve 14. It is to be noted however that whatever pressure applying means may be employed and whether the interposed sealing gasket 13 be of paper, soft metal, composition, or other packing material, nevertheless the shaft seat collar 12 which preferably comprises a hardened steel ring having a polished face, is securely clamped to the shaft and the interposed gasket is subjected to a high pressure ample to insure a tight leak proof joint entirely independent of and additional to the tension or pressure exerted upon the shaft seat collar by the thrust of the seal bearing ring 10 under influence of the spring 11.

While for simplicity and convenience of illustration the thrust sleeve 14 has been shown subject to the pressure of a helical tension spring 15, it is to be understood that in those instances wherein there is insufficient room between the fly wheel or pulley and sleeve 14 to accommodate the spring 15 a spring of other form may be substituted. The specific form of the pressure element per se is unimportant.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute, the invention has been described in language more or less specific as to structural features, it is to be understood that the invention is not limited to the specific features shown, but that the means and construction herein disclosed comprise the preferred form of several modes of putting the invention into effect, and the invention is therefore claimed in any of its forms or modifications within the legitimate and valid scope of the appended claims.

Having thus described my invention, I claim:

1. In a sylphon bearing seal for shafts, wherein a thrust collar to which the sylphon is connected has a wiping contact engagement under spring tension against a bearing surface carried by the shaft, characterized by a thrust sleeve surrounding the shaft interiorly of the sylphon, and rotating with the shaft, a peripheral shoulder on the shaft, a separate hardened bearing collar against which the sleeve has thrust engagement and against which the sylphon collar has tensioned contact bearing exteriorly of the thrust sleeve, a sealing gasket interposed between the hardened bearing collar and the peripheral shoulder upon the shaft, and a spring exerting axial pressure upon the thrust sleeve of greater degree than the pressure tension of the sylphon collar upon the hardened bearing whereby the frictional resistance between the hardened collar and the shaft will be greater than that between the sylphon collar and the hardened collar.

2. In a bearing seal for shafts wherein a nonrevoluble sealing collar is spring pressed against a rotating bearing surface, characterized by a hardened bearing collar surrounding a shaft against which the sealing collar bears, an abutment shoulder on the shaft, a gasket interposed between the bearing collar and the abutment shoulder upon the shaft, a thrust sleeve independent of the hardened bearing collar surrounding the shaft and bearing at one end upon the hardened bearing collar, and means transmitting to the sleeve axial thrust pressure against the bearing collar independently of and greater than that exerted by the spring pressed sealing collar to thereby rotate the bearing collar with the shaft against frictional influence of the sealing collar, said means for transmitting axial thrust pressure against the bearing collar being adjustable to vary the thrust pressure of the sleeve against the bearing collar without effecting a variation in the pressure exerted on the bearing collar by the spring pressed sealing collar.

3. In a bearing seal for rotary shafts, the combination with a shaft having a peripheral shoulder formed thereon, a shaft seat collar removably positioned upon the shaft adjacent to the shoulder, a bearing seal ring having wiping contact engagement with the shaft seat collar relative to which the shaft and collar are revoluble, a flexible closure connected with the bearing seal ring, and independent pressure springs urging the bearing seal ring toward the shaft seat collar and urging the shaft seat collar toward the shaft shoulder, one of said springs being adapted to produce rotation of the shaft seat collar with the shaft and relative to the bearing seal ring.

4. In a construction of the character described, a shaft having a reduced portion affording a peripheral collar, a shaft seat collar surrounding the reduced portion of the shaft adjacent to the shoulder, a bearing seal ring having wiping contact engagement with the shaft seat collar, a flexible closure element connected with the bearing seal ring, a thrust sleeve surrounding the reduced portion of the shaft and abutting on the shaft seat collar, a pair of helical tension springs, one of said springs being non-rotative and tending to press the bearing seal ring against the shaft seat collar and the other spring rotating with the shaft and exerting axial pressure upon the thrust sleeve against the shaft seat collar, the shaft seat collar being subject to the tension pressure of both springs and the pressure exerted on the shaft seat collar by the last mentioned helical spring being sufficient to rotate the shaft seat collar with the shaft in opposition to non-rotative pressure exerted on the shaft seat collar by the other helical spring.

5. In a bearing seal for revoluble shafts, a nonrevoluble bearing seal ring, a flexible closure element associated therewith, a replaceable shaft seat collar rotating with the shaft, a spring effecting a tensioned wiping contact engagement of the bearing seal ring and the replaceable shaft seat collar and a tension spring of a nature to exert clamping pressure upon the shaft seat collar greater than the pressure exerted thereon by the spring tensioned seal bearing ring.

6. In a bearing seal for revoluble shafts wherein a nonrevoluble bearing seal ring associated with a flexible closure element has spring tensioned wiping contact engagement with a replaceable shaft seat collar rotating with the shaft, characterized by an abutment shoulder upon the shaft, contiguous to which the shaft seat collar is positioned, a gasket of packing material interposed between the collar and abutment shoulder, a thrust sleeve surrounding the shaft and abutting upon the collar, and a helical spring surrounding the shaft and exerting pressure upon the sleeve to clamp the collar and gasket against the shoulder of the shaft whereby the shaft seat collar is held for rotative movement with the shaft and the gasket compressed between the shaft seat collar and the abutment shoulder on the shaft independently of the pressure exerted on the shaft seat collar and gasket by the non-revoluble seal bearing ring.

JOHN L. HOMAN.